United States Patent
Tanaka et al.

(12) 
(10) Patent No.: US 6,638,368 B2
(45) Date of Patent: Oct. 28, 2003

(54) NON-ORIENTED ELECTRICAL STEEL SHEET AND METHOD FOR PRODUCING THE SAME

(75) Inventors: Ichiro Tanaka, Amagasaki (JP); Hiroyoshi Yashiki, Kobe (JP); Mitsuyo Maeda, Sakai (JP); Taisei Nakayama, Osaka (JP); Noriyuki Honjou, Wakayama (JP); Shinsuke Mita, Sennan (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 77 days.

(21) Appl. No.: 09/985,444

(22) Filed: Nov. 2, 2001

(65) Prior Publication Data

US 2002/0043299 A1 Apr. 18, 2002

Related U.S. Application Data

(62) Division of application No. 09/593,744, filed on Jun. 14, 2000, now Pat. No. 6,340,399.

(30) Foreign Application Priority Data

Jun. 16, 1999 (JP) .......................................... 11/169759

(51) Int. Cl.[7] ................................................. H01F 1/00
(52) U.S. Cl. ...................................... 148/120; 148/111
(58) Field of Search .................................. 148/111, 120

(56) References Cited

U.S. PATENT DOCUMENTS

| 3,935,038 A | | 1/1976 | Shimoyama et al. | |
|---|---|---|---|---|
| 5,169,457 A | * | 12/1992 | Nishimoto et al. | .......... 148/111 |
| 5,186,763 A | * | 2/1993 | Kubota et al. | .............. 148/111 |
| 5,730,810 A | | 3/1998 | Takashima et al. | |
| 5,798,001 A | * | 8/1998 | Anderson | ................... 148/120 |
| 6,248,185 B1 | | 6/2001 | Kondo | |

FOREIGN PATENT DOCUMENTS

| EP | 0 511 601 A1 | * | 11/1992 |
|---|---|---|---|
| JP | 2-213418 | * | 8/1990 |
| JP | 3-120316 | * | 5/1991 |
| JP | 6-330171 | * | 11/1994 |
| JP | 08049044 A | | 2/1996 |
| JP | 08060252 A | | 3/1996 |
| JP | 10025554 A | | 1/1998 |
| JP | 11222653 A | | 8/1999 |

OTHER PUBLICATIONS

Machine translation of Japanes Patent Document No. 11–222653, Shimazu et al., (Publication date Aug., 17, 1999).*

* cited by examiner

*Primary Examiner*—John Sheehan
(74) *Attorney, Agent, or Firm*—Burns, Doane, Swecker & Mathis, LLP

(57) ABSTRACT

The non-oriented electrical steel sheet having the following chemical composition: C: 0.01% or less, Si: 2.5% or less, Mn: 2% or less, Al: 1 to 5%, Si+Al+0.5×Mn: 2.5 to 5%, with a sheet thickness of 0.1 to 0.4 mm, an average grain diameter of 50 to 180 $\mu$m and a Vickers hardness of 130 to 210. The steel sheet is excellent in workability such as punchability and interlocking performance for forming it into cores for motors and also has a lower iron loss and higher magnetic flux density, and thus when used as a core in a motor, achieves the high a motor efficiency. The steel sheet is particularly suitable as a material for cores in inverter-controlled motors.

7 Claims, No Drawings

NON-ORIENTED ELECTRICAL STEEL SHEET AND METHOD FOR PRODUCING THE SAME

This application is a divisional of application Ser. No. 09/593,744, filed on June 14, 2000 now U.S. Pat. No. 6,340,399.

This application claims priority under 35 U.S.C. §§119 and/or 365 to Japan Patent Application No. 11-169759 filed in Japan on Jun. 16, 1999, the entire content of which is herein incorporated by reference.

BACKGROUND OF THE INVENTION

1. Field of the Invention

The present invention relates to an electrical steel sheet used for rotors or stators in motors and a method for producing the same. More particularly, the present invention relates to an electrical steel sheet excellent in punchability and interlocking performance in processing it into a core as well as excellent in magnetic properties, and a production method thereof. The core produced from the electrical steel sheet of the present invention is extremely superior in magnetic properties required for the core. Accordingly, the electrical steel sheet of the present invention is particularly suitable as a material for cores used for inverter-controlled motors, such as compressor motors and electric vehicle motors and the like.

2. Description of the Related Art

In recent years, it is strongly required to reduce energy consumption from the viewpoint of the protection of the global environment. Accordingly, an improvement in the consumption amount of electricity becomes an important task for electric equipment. Therefore, the improvement in the motor efficiency is strongly required for motors which are frequently used and continuously worked such as those of refrigerators and air-conditioners.

A power substitute for a gasoline engine in an automobile has been studied as a countermeasure to solve the problem of global environment. In particular, the power generated from a motor, a combination of a motor and a gasoline engine or a combination of a motor and a diesel engine is under development and attention is being paid to electric vehicles and hybrid vehicles applying such powers. To improve the efficiency of energy of these vehicles, it is essential to improve the motor efficiency.

In order to control the motors for compressors used in electric refrigerators and air-conditioners, an inverter control system where the rotational speed is continuously controlled by frequency is mainly used to improve the motor efficiency. Further, since the rotational speed of motors in automobiles should be controlled to an optimum value between low- to high-speed according to the running speed of automobiles, inverter-controlled motors are mainly used.

In these motors, a non-oriented electrical steel sheet having a sheet thickness of about 0.20 to 0.65 mm and a Si content of 2% or more, where the content of Si and Al in total is about 2.5 to 4.5%, is usually used as a material for a core. However, a workability such as punchability for forming the steel sheet into a core shape and automatic interlocking performance for laminating the punched sheets is not sufficient. Therefore, the productivity of motors is low and in some cases the motor cannot satisfy the performance required in the above-described situations.

For example, in continuous punching processing for forming an electrical steel sheet into a core shape, a die is used. The die is easily abraded, and if the die is abraded, "burr" occurs at the edge of the punched sheet. If abrasion of the die proceeds to cause a large burr of more than 50 µm, the thickness of a core made of the punched sheets laminated therein tends to be inaccurate. Further, an electrical conduction is generated among the laminated sheets, and the eddy current loss easily increases. Accordingly, the burr should be minimized and accordingly, abrasion of the die should be prevented.

Abrasion of the die is affected by the characteristics of the steel sheet. When punching conventional very hard electrical steel sheets containing a large amount of Si, the die would be easily abraded, thus increasing the frequency of exchanging the die. As a result, since the frequency of suspending the punching operation for exchanging the die is increased, the efficiency of production of the core is lowered while the cost for polishing the die for further use is also increased.

In an automatic interlocking step, the punched steel sheets are laminated and stuck in an indented part formed on the sheet in the punching step. The strength of interlocking and the space factor of the laminated and stuck core after interlocked are affected by the material, surface state and thickness of the electrical steel sheet, and in the case of inferior interlocking performance, motors excellent in efficiency cannot be obtained.

JP-A 8-49044 and JP-A 10-25554 disclose non-oriented electrical steel sheets for motors in electric vehicles and inverter-controlled compressor motors, and these steel sheets are excellent in the motor efficiency. However, it cannot necessarily be said that the workability, such as the punchability and the interlocking performance is enough, and there still remains a room for further improvements in the motor efficiency.

SUMMARY OF THE INVENTION

The object of the present invention is to provide a non-oriented electrical steel sheet which is excellent as a material of a motor core in punchability and interlocking performance for forming it into a core and which is excellent in magnetic property when used as a core, a process for producing the same, and a core produced thereby.

The non-oriented electrical steel sheet of the present invention is 0.1 to 0.4 mm in thickness with the following chemical composition and characteristics.

Chemical com position on a mass-% basis:
  C: 0.01% or less,
  Si: 2.5% or less,
  Mn: 2% or less,
  Al: 1 to 5%,
  Si+Al+0.5×Mn: 2.5 to 5%,
  Sb: 0.3% or less, Sn: 0.3% or less, B: 0.01% or less,
  the balance: Fe and impurities.
Characteristics:
  Average grain diameter: 50 to 180 µm, and
  Vickers hardness: 130 to 210.

If the thickness of the steel sheet is 0.2 to 0.4 mm and the Mn content is 1% or less, the magnetic property is further improved. In the steel sheet, the Al content is preferably 1.5 to 5%. The ratio (Al/Si) of Al to Si is preferably 0.7 to 1.4, more preferably more than 0.8 to 1.3.

If the surface roughness of the steel sheet in terms of arithmetical mean roughness Ra is 0.5 µm or less, the space factor of the core is high, and thus when used in a motor, the motor efficiency can be improved.

The non-oriented electrical steel sheet of the present invention can be produced in the following steps:

(1) preparing a slab having the above-mentioned chemical composition;
(2) heating the slab at a temperature of 1300° C. or less and hot rolling the slab into a plate;
(3) after the hot rolling, cold rolling the plate into a sheet until the thickness thereof becomes 0.1 to 0.4 mm; and
(4) finish-annealing the sheet at a temperature of 700 to 1150° C.

In production of a steel sheet with a surface roughness of 0.5 μm or less in terms of arithmetical mean roughness Ra, a roll having a surface roughness of 1.5 μm or less in terms of arithmetical mean roughness Ra is preferably used in cold rolling. Annealing at 600 to 1000° C. may be conducted before cold rolling, or before cold rolling and between plural times of cold rolling.

The motor core of the present invention can be obtained by a process such that the non-oriented electrical steel sheet of the present invention is punched, and the punched sheets are laminated and interlocked. A motor using this core exhibits good motor characteristics because the core is excellent in magnetic property such as magnetic flux density, iron loss etc. Accordingly, the core of the present invention is very suitable for inverter-controlled motors such as compressor motors, electric vehicle motors etc.

In this invention, the interlocking means a work where the plurality of the punched steel sheets with indented portions formed on the sheet in the punching step are laminated one above the other in a manner that the indented portions of one sheet are inserted into those of another sheet, and then the laminated sheets are pressed so that the sheets are mechanically bonded to each other.

DETAILED DESCRIPTION OF THE INVENTION

To improve the efficiency of inverter-controlled motors such as compressor motors and electric vehicle motors, the steel sheet is required to have the magnetic properties of low iron loss in a wide frequency range and high magnetic flux density. Further, the steel sheet should satisfy the material strength required when used as the core. Further, it is required to be excellent in workability such as punchability and automatic interlocking performance for forming it into a core.

The electrical steel sheet of this invention has a sheet thickness of 0.1 to 0.4 mm wherein the Si content is as low as 2.5% or less and the Al content is as high as 1 to 5%. Further, Si+Al+0.5 Mn (formula (1)) is limited in the range of 2.5 to 5%. In addition, the hardness of the steel sheet, in terms of Vickers hardness Hv, is as low as 130 to 210, and the average grain diameter is limited in the range of 50 to 180 μm.

The Si content is limited in the low range so that punchability is secured by preventing an increase in the hardness of the steel sheet. The deterioration in iron loss caused by this reduction of the Si content is compensated by increasing the Al content and simultaneously selecting the applicable range in the formula (1). The electrical steel sheet of this invention satisfies all these conditions and thus satisfies the magnetic properties and workability aimed as the object of this invention.

Hereinafter, the electrical steel sheet of this invention, a process for producing the same, and a motor core made of the electrical steel sheet of this invention are described in more detail. In the following description, the term "%" referring to the contents of chemical components means % by mass. Chemical composition of the steel sheet C: Since C in the steel sheet raises the iron loss, the C content is preferably lower. In particular, if the C content exceeds 0.01%, solute carbon in the steel is precipitated as carbides so that when the steel is used as a core, a deterioration of iron loss occurs. Accordingly, the C content shall be 0.01% or less. Desirably, it is 0.005% or less.

Si: Si raises the electrical resistance of the steel sheet and lowers the eddy current loss, and thus Si has the action of lowering the iron loss. On the other hand, Si significantly increases the hardness of the steel sheet, thus lowering the punchability. In the present invention, the Si content shall be 2.5% or less to secure the punchability. The punchability is not lowered even if the Si content is too low, and thus Si may not be added. However, in view of securing a material strength, Si content is preferably 0.1% or more, more preferably 0.5% or more.

Further, its content may be selected in consideration of magnetic properties such as iron loss required of the steel sheet.

Mn: The influence of Mn on the magnetic properties of the steel sheet is relatively low so that it may not be added. However, Mn raises the electrical resistance of the steel sheet and thus has the action of lowering the iron loss. To achieve this effect, this element may be added. Further, it also has the action of improving hot workability. However, if the Mn content exceeds 2%, the saturation induction of the steel sheet is lowered. Furthermore, the cost of Mn added is increased, resulting in an increase in the production cost. Accordingly, the Mn content should be 2% or less. The Mn content is preferably 1% or less. To achieve the effect of lowering the iron loss and improving the hot workability, the Mn content is desirably 0.05% or more.

Al: Similar to Si, Al has the action of raising the electrical resistance of the steel sheet and thus works for lowering the eddy current loss and reducing the iron loss. In addition, as compared with Si, this element will, when added in the same amount, exhibit a lower effect of increasing the hardness of the steel sheet. Accordingly, it is very important element for achieving both punchability and magnetic properties. To secure both punchability and magnetic properties, the Al content should be 1% or more. However, if the Al content exceeds 5%, the saturation induction of the steel sheet is lowered, as is the case with Si and Mn. Accordingly, the Al content shall be 1 to 5%. The Al content is preferably in the range of 1.5 to 5%.

Si+Al+0.5×Mn:

All Si, Al and Mn have the action of raising the electrical resistance of the steel sheet and lowering the iron loss. On the other hand, these elements when added in excess cause a reduction in the saturation induction of the steel sheet. The influence of these elements when added in the same amount on magnetic properties is that the effect of Si is equivalent to that of Al and is about twice as high as that of Mn. By comprehensively considering these 3 elements, their contents should be suitably selected.

In the present invention, the contents shown in the formula (1) below were selected to satisfy 2.5 to 5%.

If the contents shown in the formula (1) are less than 2.5, the effect of lowering the iron loss of the steel sheet is not satisfactory, whereas if the contents are more than 5%, the saturation induction of the steel sheet becomes too low.

$$Si(\%)+Al(\%)+0.5\times Mn(\%) \qquad (1)$$

Al/Si:

In order to improve the magnetic properties further, it is desirable that Al and Si are contained in nearly equal amounts. This improvement in the magnetic properties may be due to a change of magnetic domain. To secure this effect, Al/Si is preferably 0.7 to 1.4. The Al/Si is more preferably in the range of 0.8 to 1.4.

P, S, N:

The contents of P, S and N are preferably lower. From the viewpoint of the hardness of the steel sheet, P is desirably 0.03% or less. From the viewpoint of iron loss, S and N are desirably 0.01% or less and 0.006% or less, respectively.

Sb, Sn, B:

These elements have the action of improving magnetic properties and may be added as necessary. If added, the contents of Sb, Sn and B are preferably 0.3% or less, 0.3% or less and 0.01% or less, respectively, and the desirable lower limits of Sb, Sn and B contents are 0.005%, 0.005% and 0.0002%, respectively.

Other impurity elements are not problematic insofar as the contents of impurities are within the range of amounts contained in steel produced according to a conventional steel-making process.

Thickness of the Steel Sheet

The thickness of the steel sheet (sheet thickness) has a significant influence on iron loss. Making the sheet thickness thinner is very effective for reduction in eddy current loss in a high-frequency range. However, as the sheet thickness is decreased, the number of punched sheets is increased to form the core of the desired thickness, thus causing a reduction in the productivity of a core. In addition, if the steel sheet is too thin, sufficient sticking force cannot be obtained when punched sheets are laminated and stuck into a core by an automatic interlocking system. Further, the space factor tends to be lowered. Here, the space factor means a packing rate of punched sheets laminated into a core, which is calculated by dividing the actual weight of punched sheets laminated in a core by the theoretical weight of punched sheets laminated with no gap between them in a core and represented by weight %. These properties are significantly affected by a sheet thickness particularly when the sheet thickness is 0.1 mm or less. When the sheet thickness is 0.1 mm or less, even if the magnetic properties of the steel sheet is excellent, the steel sheet cannot exhibit the sufficient performance and thus the desired motor efficiency cannot be achieved. The lower limit of the sheet thickness is preferably 0.2 mm.

On the other hand, if the sheet thickness is more than 0.4 mm, the eddy current loss increases, and thus the increase of the iron loss is significant. For use of the steel sheet particularly at a high frequency of 200 to 10000 Hz, the sheet thickness is preferably 0.35 mm or less so that the iron loss can be further lowered.

Accordingly, the sheet thickness shall be 0.1 to 0.4 mm. It is preferably 0.2 to 0.4 mm, more preferably 0.2 to 0.35 mm.

Hardness of the Steel Sheet

Hardness has a very important meaning for the steel sheet of the present invention. If the hardness of the steel sheet is more than 210 in terms of Vickers hardness Hv, a die used in punching is significantly abraded, thus significantly reducing productivity in punching as described above. On the other hand, if the hardness Hv is less than 130, the steel sheet, when formed into a core and used as a rotor in a motor, is too poor in strength to endure the high-rotational speed of the rotor.

Accordingly, the hardness Hv shall be 130 to 210. It is desirably 140 to 200.

Vickers hardness may be measured on the surface of the steel sheet with 9.8 to 49N test loading in accordance with JIS Z 2244.

Average Grain Diameter of the Steel Sheet

The average grain diameter of the steel sheet shall be 50 to 180 µm. In a case of fine grains having an average grain diameter of less than 50 µm, the iron loss is significant. Accordingly, when the steel sheet having fine grains is used in motor, good motor efficiency cannot be achieved. The lower limit of the average grain diameter is desirably 60 µm. On the other hand, coarse grains having an average grain diameter of more than 180 µm increase the eddy current loss, and thus the iron loss is significant in a high frequency range.

Accordingly, the average grain diameter of the steel sheet is 50 to 180 µm, preferably 60 to 180 µm.

The average grain diameter is the average of grain diameters measured at a cross section of the thickness direction and the rolling direction (a longitudinal cross section parallel to the direction of rolling). This average grain diameter can be determined on the basis of an optical microphotograph (×100) of the longitudinal cross section by measuring, in a cutting method, the grain diameter about 2 or 3 times in total repeatedly in the direction of sheet thickness and in the direction of rolling, respectively, and then calculating the average of the measured grain diameters. Here, a cutting method is a method of determining the average grain diameter in a manner that a line is drawn on a microphotograph to cross grains and the length of the line is divided by the number of grains crossing the line.

Surface Roughness of the Steel Sheet

The surface roughness of the steel sheet affects the space factor of a core. The surface roughness is preferably 0.5 µm or less in terms of the arithmetical mean roughness Ra because the space factor is easily lowered when the surface roughness Ra exceeds 0.5 µm. The lower limit of the surface roughness Ra is preferably to be lower. However, the lower limit of the surface roughness Ra obtained in the production of a usual commercial scale is about 0.1 µm.

Process for Producing the Steel Sheet

The non-oriented electrical steel sheet of this invention can be produced in a usual process by use of ordinarily used production facilities.

First, a slab having the above-described chemical composition is prepared. The slab may be a flattened slab for steel sheet produced by continuous casting or a flattened one produced by rolling an ingot produced in an ingot making process.

Before hot rolling, the slab is heated. The heating temperature in this step is desirably 1300° C. or less. If the heating temperature is more than 1300° C., the magnetic properties may be lowered. On the other hand, if the heating temperature is too low, the slab may easily crack during the hot working, and thus the lower limit of the heat temperature is desirably 1100° C. Accordingly, the heating temperature is preferably 1100 to 1300° C., more preferably 1100 to 1250° C. In the hot rolling process, the slab is rolled to a plate with a thickness of about 1.5 to 2.5 mm.

After hot rolling, the hot-rolled plate may be annealed for further improving the magnetic properties before cold rolling. If the temperature for annealing the hot-rolled plate is too low, there is no effect, while if it is too high, grains are coarsened and the steel plate may be broken during cold rolling, and thus the annealing temperature is preferably in the range of 600 to 1000° C.

Before cold rolling, an acid pickling treatment is preferably conducted for removal of an oxide layer formed on the surface of the steel sheet.

Cold rolling may be conducted once or several times. If cold rolling is repeated several times, intermediate annealing is conducted between cold rolling and next cold rolling. Through this cold rolling, the steel plate is rolled to a steel sheet with a thickness in the range of 0.1 to 0.4 mm. The intermediate annealing temperature between the cold rolling steps is desirably 600 to 1000° C.

In order to obtain the steel sheet with the surface roughness of 0.5 μm or less in terms of the arithmetical mean roughness Ra, the surface roughness of the final passing roll for cold rolling is preferably 1.5 μm or less. The final passing roll means a work roll in the reverse rolling mill and a work roll in the final stand in the tandem rolling mill.

The finish annealing after cold rolling is conducted preferably at a temperature in the range of 700 to 1150° C. At a temperature of less than 700° C., recrystallization does not sufficiently occur, and thus the steel sheet excellent in magnetic properties cannot be obtained and the hardness of the steel sheet tends to be too high. On the other hand, if it exceeds 1150° C., the grains are readily coarsened, and the punchability for forming the sheet into a core is easily deteriorated.

The hardness and average grain diameter can be controlled by the annealing temperature and annealing time in the finish annealing. Practically, the relationship between annealing temperature or annealing time and hardness or average grain diameter is previously examined, and on the basis of this relationship, the optimum conditions are selected.

After annealing, the surface of the steel sheet may be coated as necessary with a resin coating with a thickness of about 0.1 to 0.8 μm. The resin coating has the function of improving the punchability of the steel sheet when formed into a core and simultaneously improving electrical insulation among laminates in the core. The resin coating may be a single organic resin and a mixture of an organic resin and an inorganic material.

The resin is preferably methyl methacrylate resin, styrene resin, vinyl acetate resin etc. As the inorganic material, magnesium chromate, aluminum chromate etc. can be used.

Process for producing the core:

The core made of the steel sheet of this invention may be produced in accordance with an industrially used conventional production process. Specifically, the steel sheet is first punched out continuously in a predetermined shape. In the punching step, the indent portions are formed for sticking the punched sheet after lamination. Then, the predetermined number of sheets are laminated to form a lamination core. In the interlocking step, the indent portions formed on the respective punched sheets in the punching step are mechanically attached and stuck to each other to form a lamination core, that is, a core.

EXAMPLES

The chemical compositions of slabs of 227 mm in thickness and 1000 mm in width used in the test are shown in Table 1.

TABLE 1

| Steel type | Chemical composition (Mass %, Balance Fe) | | | | | | | | | |
|---|---|---|---|---|---|---|---|---|---|---|
| | C | Si | Mn | Al | P | S | N | Si + Al + 0.5 Mn | Al/Si | Reference |
| A | 0.003 | 2.8* | 0.20 | 1.0 | 0.013 | 0.005 | 0.0007 | 3.9 | 0.36 | |
| B | 0.003 | 1.9 | 0.20 | 1.9 | 0.013 | 0.007 | 0.0008 | 3.9 | 1.00 | |
| C | 0.002 | 2.0 | 0.17 | 1.8 | 0.012 | 0.005 | 0.0008 | 3.9 | 0.90 | |
| D | 0.001 | 1.9 | 0.22 | 2.4 | 0.013 | 0.005 | 0.0007 | 4.4 | 1.26 | |
| E | 0.003 | 1.8 | 0.20 | 2.0 | 0.013 | 0.006 | 0.0007 | 3.9 | 1.11 | |
| F | 0.003 | 0.8 | 0.18 | 3.0 | 0.013 | 0.005 | 0.0007 | 3.9 | 3.75 | |
| G | 0.003 | 0.6 | 0.23 | 3.2 | 0.012 | 0.005 | 0.0009 | 3.9 | 5.33 | |
| H | 0.002 | 0.1 | 0.20 | 3.8 | 0.013 | 0.005 | 0.0007 | 4.0 | 38 | |
| I | 0.002 | 3.0* | 0.30 | 0.01* | 0.012 | 0.006 | 0.0007 | 3.2 | 0.003 | |
| J | 0.003 | 0.9 | 0.19 | 2.3 | 0.013 | 0.006 | 0.0009 | 3.3 | 2.56 | |
| K | 0.002 | 0.5 | 0.31 | 2.5 | 0.013 | 0.005 | 0.0008 | 3.2 | 5.00 | |
| L | 0.003 | 0.1 | 0.31 | 2.9 | 0.013 | 0.005 | 0.0008 | 3.2 | 30 | |
| M | 0.003 | 2.2 | 0.20 | 1.6 | 0.013 | 0.007 | 0.0008 | 3.9 | 0.73 | |
| N | 0.003 | 1.6 | 0.20 | 2.2 | 0.013 | 0.005 | 0.0007 | 3.9 | 1.38 | |
| O | 0.003 | 0.8 | 0.20 | 1.5 | 0.013 | 0.007 | 0.0008 | 2.4* | 1.88 | |
| P | 0.003 | 3.0* | 0.20 | 2.0 | 0.013 | 0.005 | 0.0007 | 5.1* | 0.67 | |
| R | 0.001 | 1.7 | 2.0 | 2.0 | 0.013 | 0.005 | 0.0007 | 4.7 | 1.18 | |
| S | 0.001 | 1.6 | 1.2 | 2.0 | 0.013 | 0.005 | 0.0007 | 4.2 | 1.25 | |
| T | 0.002 | 2.0 | 0.20 | 1.8 | 0.012 | 0.005 | 0.0008 | 3.9 | 0.90 | B: 0.0003 |
| U | 0.002 | 2.0 | 0.20 | 1.8 | 0.011 | 0.005 | 0.0009 | 3.9 | 0.90 | Sb: 0.008 |
| V | 0.002 | 2.0 | 0.20 | 1.7 | 0.011 | 0.006 | 0.0009 | 3.8 | 0.85 | Sn: 0.008 |

Note)
*indicates conditions outside the range defined in the present invention

Example 1

The slabs of steels C, F and J whose chemical compositions shown in Table 1 satisfied the limitation of the present invention were heated at the various temperatures shown in Table 2 as the slab heating temperature and then hot rolled to the plates. After hot rolling, the rolled plates were heat-treated at the various hot plate annealing temperature and then cold rolled to the sheets with various thickness. After cold rolling, the sheets were annealed at the various finish annealing temperature shown in Table 2 and thereby the test materials with various hardness were prepared. The thickness and hardness of the tested sheet are shown in Table 2.

finish annealing was conducted to the steel sheets at a temperature of 900 to 1150° C. for 30 seconds. By this annealing, the test materials with various hardness and average grain diameter were prepared. After the finish annealing, the surface of each steel sheet was covered with the coating of the inorganic magnesium chromate having resin particles dispersed therein with a thickness of 0.4 μm. The thus-obtained steel sheets were examined for the material characteristics and the magnetic properties.

The hardness of the steel sheet was determined on the surface of the steel sheet by the Vickers hardness measuring method (loading: 9.8 N) according to JIS Z 2244. The average grain diameter of the steel sheet was determined on

TABLE 2

| No. | Steel type | Slab heating temperature (° C.) | Annealing temperature of hot-rolled sheet (° C.) | Sheet thickness (mm) | Finish annealing temperature (°C.) | Hardness Hv | Punchability (number of times of punching conducted until burr reaches to 50 μm) |
|---|---|---|---|---|---|---|---|
| 1 | C | 1150 | 820 | 0.27 | 1100 | 192 | 460000 |
| 2 | C | 1150 | 820 | 0.27 | 1060 | 196 | 430000 |
| 3 | C | 1150 | 820 | 0.27 | 980 | 208 | 360000 |
| 4 | C | 1150 | 820 | 0.27 | 900 | 220* | 290000 |
| 5 | F | 1120 | 800 | 0.27 | 1080 | 190 | 470000 |
| 6 | F | 1120 | 800 | 0.27 | 1000 | 205 | 370000 |
| 7 | F | 1120 | 800 | 0.27 | 900 | 217* | 300000 |
| 8 | F | 1120 | ** | 0.27 | 1050 | 195 | 430000 |
| 9 | J | 1100 | 850 | 0.35 | 1000 | 146 | 690000 |
| 10 | J | 1100 | 850 | 0.35 | 950 | 143 | 740000 |
| 11 | J | 1100 | 850 | 0.35 | 900 | 150 | 720000 |
| 12 | J | 1100 | 850 | 0.35 | 875 | 156 | 680000 |

Note)
*indicates conditions outside the range defined in the present invention.
**indicates no annealing.

The punchability of the steel sheet was examined by the continuous punching test. The conditions in the punching test were as follows: blank size: 17 mm in length and width, dice material: SKD11, number of strokes: 350 times/min and clearance: 5%. A punching oil was used at the time of punching. The punchability was evaluated by the number of punching times where the burr height of punched sheet reached to 50 μm. The test results are shown in Table 2.

As shown in Test Nos. 4 and 7, even though the chemical composition of the steel was in the limitation defined in the present invention, if the finish annealing temperature was too low and the hardness exceeded the upper limit defined in the present invention, the dice life was short. That is, in the case of Test Nos. 4 and 7, the number of times of punching conducted until the burr height of the punched sheet reached to 50 μm was 300,000 or less which was lower by 20% or more than those of the other samples which satisfy the conditions defined in the present invention.

Example 2

The slabs with the chemical compositions shown in Table 1 were heated at 1250° C. and then rolled to the plates with a thickness of 2.2 mm by hot rolling. After acid pickling, the hot-rolled plates were annealed by the batch annealing at 820° C. for 10 hours in a hydrogen atmosphere. Thereafter, the plates were rolled to the steel sheets with 0.15 to 0.50 mm by the cold rolling once. The surface roughness of the final passing roll used in cold rolling was 0.8 μm in terms of arithmetical mean roughness Ra. After cold rolling, the the basis of an optical microphotograph (×100) of a longitudinal cross section by means of measuring the grain diameter 2 times in total by the cutting method and calculating the average of the measured values, as described before.

Regarding the magnetic properties, $W_{15/50}$, $W_{15/400}$ (Iron loss (W/kg) at 1.5 T, 50 Hz, 400 Hz) and B50 (Magnetic flux density at 5000 A/m) were examined by using an epstein test specimen (280 mm×30 mm) in accordance with JIS C 2550.

In order to evaluate the motor efficiency, the 4 poles interior permanent magnet synchronos motors worked under the inverter control system were manufactured for the test. After the steel sheets were formed into the core, the core used in the motor was subjected to stress relief annealing at 750° C. for 2 hours. The motor efficiency was evaluated by changing the inverter frequency in the range of 30 to 300 Hz. The motor efficiency indicates the ratio of output energy to input electrical energy. The comparison of the motor efficiency between the tested motors was conducted by using the peak efficiency (highest efficiency in the frequency range of 30 to 300 Hz). The test results are shown in Table 3.

The interlocking performance of the core was evaluated on the ring core with the outside diameter of 45 mm and the inside diameter of 33 mm interlocked at 4 portions which was made by the automatic interlocking die. The bonding strength of the interlocking ring core was measured by a tensile test machine and the interlocking strength per one portion was calculated.

TABLE 3

| No. | Steel type | Si + Al + 0.5 Mn | Al/Si | Sheet thickness (mm) | Hardness Hv | Grain diameter (μm) | W15/50 (W/kg) | W15/400 (W/kg) | B50 (T) | Motor efficiency (%) | Surface roughness Ra (μm) | Space factor (%) |
|---|---|---|---|---|---|---|---|---|---|---|---|---|
| 1 | A* | 3.9 | 0.36 | 0.27 | 220* | 115 | 2.15 | 32.5 | 1.67 | 94.7 | 0.28 | 98.0 |
| 2 | B | 3.9 | 1.00 | | 182 | 116 | 2.07 | 32.1 | 1.68 | 95.5 | 0.12 | 98.5 |
| 3 | C | 3.9 | 0.90 | | 185 | 120 | 2.08 | 32.1 | 1.67 | 95.2 | 0.27 | 97.6 |
| 4 | E | 3.9 | 1.11 | | 182 | 112 | 2.08 | 31.0 | 1.67 | 95.1 | 0.21 | 98.1 |
| 5 | F | 3.9 | 3.75 | | 164 | 114 | 2.16 | 32.5 | 1.67 | 94.9 | 0.27 | 97.7 |
| 6 | G | 3.9 | 5.33 | | 155 | 140 | 2.16 | 32.6 | 1.67 | 94.9 | 0.27 | 97.5 |
| 7 | H | 4.0 | 38 | | 146 | 116 | 2.19 | 32.8 | 1.66 | 94.8 | 0.12 | 98.6 |
| 8 | H | 4.0 | 38 | | 150 | 41* | 3.03 | 43.6 | 1.67 | 93.9 | 0.21 | 98.2 |
| 9 | M | 3.9 | 0.73 | | 189 | 118 | 2.10 | 32.2 | 1.67 | 95.1 | 0.27 | 97.6 |
| 10 | N | 3.9 | 1.38 | | 174 | 115 | 2.10 | 32.3 | 1.67 | 95.1 | 0.28 | 98.1 |
| 11 | I* | 3.2 | 0.003 | 0.3 | 215* | 122 | 2.38 | 37.3 | 1.69 | 94.4 | 0.25 | 98.4 |
| 12 | J | 3.3 | 2.56 | | 147 | 130 | 2.23 | 36.0 | 1.69 | 94.6 | 0.10 | 98.4 |
| 13 | K | 3.2 | 5.00 | | 142 | 121 | 2.31 | 36.5 | 1.69 | 94.4 | 0.40 | 97.9 |
| 14 | L | 3.2 | 30 | | 125* | 123 | 2.39 | 37.7 | 1.68 | 94.0 | 0.30 | 98.7 |
| 15 | R | 4.7 | 1.18 | | 190 | 109 | 2.09 | 34.8 | 1.67 | 94.9 | 0.27 | 98.6 |
| 16 | S | 4.2 | 1.25 | | 178 | 113 | 2.11 | 35.1 | 1.67 | 95.1 | 0.21 | 98.7 |
| 17 | D | 4.4 | 1.26 | 0.35 | 196 | 130 | 2.03 | 38.0 | 1.66 | 94.8 | 0.28 | 98.0 |
| 18 | E | 3.9 | 1.11 | | 185 | 110 | 2.13 | 40.0 | 1.68 | 94.5 | 0.45 | 98.0 |
| 19 | O* | 2.4* | 1.88 | | 127* | 112 | 2.41 | 44.0 | 1.69 | 93.3 | 0.35 | 98.0 |
| 20 | P* | 5.1* | 0.67 | | 230* | 108 | 2.11 | 38.0 | 1.62 | 94.1 | 0.26 | 98.7 |
| 21 | F | 3.9 | 3.75 | 0.5* | 165 | 116 | 2.61 | 63.5 | 1.68 | 93.1 | 0.85* | 88.0 |
| 22 | F | 3.9 | 3.75 | 0.15 | 169 | 85 | 1.97 | 25.8 | 1.68 | 94.2 | 0.10 | 95.4 |
| 23 | T | 3.9 | 0.9 | 0.33 | 185 | 108 | 2.09 | 38.0 | 1.67 | 94.9 | 0.20 | 98.1 |
| 24 | U | 3.9 | 0.9 | | 182 | 111 | 2.08 | 38.0 | 1.67 | 95.1 | 0.11 | 98.5 |
| 25 | V | 3.8 | 0.85 | | 184 | 98 | 2.09 | 38.0 | 1.67 | 95.0 | 0.15 | 98.8 |

Note)
*indicates conditions outside the range defined in the present invention.

In Test Nos. 1, 11 and 20, the Si contents in the tested materials (Steel A, I, P) were more than the upper limit of the range defined in the present invention, and thus their hardness was too high. In Test No. 20 among these samples, Si+Al+0.5 Mn was outside the upper limit of the range defined in the present invention, and thus its magnetic flux density was also low.

In Test No. 14, the chemical composition satisfies the limitation defined in the present invention, but the hardness of the steel sheet was too low (i.e., 125), and thus the required strength of the motor core was deficient.

In Test No. 21, the sheet thickness exceeded the upper limit of the range defined in the present invention, thus making the iron loss inferior. Further, the arithmetical mean roughness Ra was too high (i.e., 0.85 μm), and thus the space factor was small, and the motor efficiency was relatively low.

In Test No. 8, since the finish annealing temperature was as low as 900° C., the average grain diameter was small and outside the lower limit defined in the present invention, thus making the iron loss significant and the motor efficiency relatively low.

In Test No. 19, Si+Al+0.5 Mn was outside the lower limit of the range defined in the present invention, thus making the iron loss inferior. Further, the hardness of the steel sheet was too low so that the required strength of the motor core was deficient.

The test samples other than those described above satisfied the conditions defined in the present invention, and were thus excellent in magnetic properties and had suitable hardness. Accordingly, they were also excellent in the motor efficiency. In particular, the samples (Test Nos. 2 to 4, 9, 10, 15 to 18 and 23 to 25) wherein Al/Si was in the suitable range were excellent both in magnetic properties and in motor efficiency.

In Test Nos. 17 and 18, the interlocking strength per one portion measured by the above-mentioned method was 33 MPa for No. 17 and 42 MPa for No.18. Accordingly, they were excellent in the automatic interlocking performance.

The non-oriented electrical steel sheet of the present invention has the optimum conditions selected for chemical composition, sheet thickness, hardness and average grain diameter respectively, and thus it is excellent in magnetic properties and superior in punchability when formed into a core for a motor. Accordingly, the life of a die used in the punching step is long, the shape of a lamination core is-good, and the space factor is also high. Further, the life of the die is long and the punching process is easy, and the productivity and operativeness of the cores are extremely good. The non-oriented electrical steel sheet of this invention is particularly suitable for cores of the inverter controlled motor, such as the compressor motors of refrigerators and air conditioners and the electric vehicle motors. In these uses, there are the advantages that the productivity of the cores is high and the iron loss is low in a wide frequency region. Accordingly, the higher motor efficiency can be achieved.

What is claimed is:

1. A method for producing a non-oriented electrical steel sheet having an average grain size of 50 to 180 microns and a Vickers hardness of 130 to 210 comprising the steps of:

(1) preparing a slab having the following chemical composition on a mass % basis, C: 0.01% or less, Si: 2.5% or less, Mn: 2% or less, Al: 1 to 5%, Si+Al+0.5×Mn: 2.5 to 5%, Sb: 0.3% or less, Sn: 0.3% or less, B: 0.01% or less, the balance: Fe and impurities;

(2) heating the slab at a temperature of 1300° C. or less and hot rolling the slab to a plate;

(3) after the hot rolling, cold rolling the plate to a sheet until its thickness becomes 0.1 to 0.4 mm; and (4) finish annealing the sheet at a temperature of 700 to 1150° C.

2. The method according to claim 1, wherein the ratio (Al/Si) of Al to Si in the slab is 0.7 to 1.4.

3. The method according to claim 1, wherein the cold rolling is performed with a roll whose surface roughness is 1.5 μm or less in terms of the arithmetical mean roughness Ra.

4. The method according to claim 2, wherein the cold rolling is performed with a roll whose surface roughness is 1.5 μm or less in terms of the arithmetical mean roughness Ra.

5. The method according to claim 1, further comprises annealing the plate or the sheet at 600 to 1000° C. before cold rolling, or before cold rolling and between plural times of cold rolling.

6. The method according to claim 2, comprises annealing the plate or the sheet at 600 to 1000° C. before cold rolling, or before cold rolling and between plural times of cold rolling.

7. The method according to claim 3, further comprises annealing the plate or the sheet at 600 to 1000° C. before cold rolling, or before cold rolling and between plural times of cold rolling.

* * * * *